US012042983B2

United States Patent
Folkins et al.

(10) Patent No.: US 12,042,983 B2
(45) Date of Patent: Jul. 23, 2024

(54) METHOD FOR BUILDING THREE-DIMENSIONAL PRINTED OBJECTS WITH MATERIALS HAVING DIFFERENT PROPERTIES

(71) Applicant: Xerox Corporation, Norwalk, CT (US)

(72) Inventors: Jeffrey J. Folkins, Rochester, NY (US); Paul J. McConville, Webster, NY (US); Anthony S. Condello, Webster, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 18/056,198

(22) Filed: Nov. 16, 2022

(65) Prior Publication Data

US 2023/0078762 A1 Mar. 16, 2023

Related U.S. Application Data

(62) Division of application No. 15/050,572, filed on Feb. 23, 2016, now Pat. No. 11,613,070.

(51) Int. Cl.
| | |
|---|---|
| *B29C 64/112* | (2017.01) |
| *B29C 64/336* | (2017.01) |
| *B29C 64/386* | (2017.01) |
| *B33Y 10/00* | (2015.01) |
| *B33Y 30/00* | (2015.01) |
| *B33Y 50/02* | (2015.01) |
| *B29L 31/34* | (2006.01) |

(52) U.S. Cl.
CPC .......... *B29C 64/112* (2017.08); *B29C 64/336* (2017.08); *B29C 64/386* (2017.08); *B33Y 10/00* (2014.12); *B33Y 30/00* (2014.12); *B33Y 50/02* (2014.12); *B29L 2031/34* (2013.01)

(58) Field of Classification Search
CPC ............... B29C 64/106; B29C 64/209; B29C 64/264; B29C 64/393
See application file for complete search history.

(56) References Cited

U.S. PATENT DOCUMENTS

| | | | |
|---|---|---|---|
| 9,018,769 B2 | 4/2015 | Oganesian et al. | |
| 11,613,070 B2 * | 3/2023 | Folkins ................ | B29C 64/386 |
| | | | 425/130 |
| 2007/0022602 A1 | 2/2007 | Kingsford et al. | |
| 2013/0073068 A1 * | 3/2013 | Napadensky ......... | B29C 64/106 |
| | | | 700/98 |
| 2014/0138345 A1 | 5/2014 | Hong et al. | |
| 2017/0203508 A1 * | 7/2017 | Dikovsky ............... | H05K 3/30 |

FOREIGN PATENT DOCUMENTS

WO 2008/102266 A2 8/2008

OTHER PUBLICATIONS

Patent Trial and Appeal Board Decision in Appeal No. 202-001936, U.S. Pat. No. 11,613,070.*

* cited by examiner

*Primary Examiner* — Peter L Vajda
(74) *Attorney, Agent, or Firm* — Maginot Moore & Beck LLP

(57) ABSTRACT

A method of manufacturing a three-dimensional object operates components in an additive manufacturing system with reference to a difference between quantifications identified for different properties of at least two materials in a same layer. The method enables the layer to be formed with compensation for the differences in the quantifications of the properties of the two materials.

19 Claims, 2 Drawing Sheets

METHOD FOR BUILDING THREE-DIMENSIONAL PRINTED OBJECTS WITH MATERIALS HAVING DIFFERENT PROPERTIES

PRIORITY CLAIM

This application is a divisional application of U.S. patent application Ser. No. 15/050,572, which is entitled "System And Method For Building Three-Dimensional Printed Objects With Different Materials Having Different Properties," which was filed on Feb. 23, 2016, and which issued as U.S. Pat. No. 11,613,070 on Mar. 28, 2023.

TECHNICAL FIELD

The system and method disclosed in this document relate to the manufacture of three-dimensional printed objects and, more particularly, to the building of three-dimensional objects using materials having different properties.

BACKGROUND

Digital three-dimensional object manufacturing, also known as digital additive manufacturing, is a process of making a three-dimensional solid object of virtually any shape from a digital model. Three-dimensional object printing is an additive process in which successive layers of material are formed on a substrate in different shapes. The layers can be formed by ejecting binder material, directed energy deposition, extruding material, ejecting material, fusing powder beds, laminating sheets, or exposing liquid photopolymer material to a curing radiation. The substrate on which the layers are formed is supported either on a platform that can be moved three dimensionally by operation of actuators operatively connected to the platform, or the material deposition devices are operatively connected to one or more actuators for controlled movement of the deposition devices to produce the layers that form the object. Three-dimensional object printing is distinguishable from traditional object-forming techniques, which mostly rely on the removal of material from a work piece by a subtractive process, such as cutting or drilling.

Additive manufacturing of three-dimensional printed can include the use of materials having multiple competing properties. For example, the formation of electrically conductive paths within or upon electrically insulating structures of a printed electrical device can include the provision of an aqueous or solvent-based metallic colloidal solution within or upon an electrically insulating structure made with an ultraviolet (UV) curable polymer. The conductive material can have very different curing and sintering conditions than the insulating structures. The polymers typically require much less energy to bind the layer, while the metallic solutions need much higher temperatures to fuse together. Exposure of the polymer material to the higher heat of the metallic colloidal solution binding process may adversely affect the structure of the polymer. Thus, formation of the electrical traces may occur at a different time than the formation of the electrically insulating structures to avoid this exposure. Additionally, the volume of the metallic colloidal solution is significantly reduced as the water or solvent is volatized. The drops of the UV curable polymer or other electrically insulating material, however, maintain approximately the same volume the drops had when they were ejected. The different volumes in the two materials produced by the curing, drying, and sintering of the materials produce voids or dips in the layer. Consequently, subsequent layers formed on this uneven layer can have deformities in their structure. Thus, the coordinating of the application, drying, curing, and sintering of the different materials used to make an object is important for the reliable and level formation of layers in an object. An additive manufacturing process that enables layers for a part to be formed with reference to the different properties of the materials and their drying, curing, or sintering would be beneficial.

SUMMARY

An additive manufacturing method that coordinates the curing, drying, and sintering of materials having different properties during the additive manufacturing of three-dimensional printed objects includes receiving with a controller rendered data corresponding to an object to be formed by an additive manufacturing system, identifying with the controller at least two materials for forming a layer of the object with reference to the received rendered data, one material of the at least two materials having a material property that is different than a material property of another material of the at least two materials, identifying with the controller a quantification for each different material property, modifying with the controller the rendered data with reference to the identified quantification for each different material property, and operating with the controller material applicators configured to apply the two materials having different material properties to the object being formed, the material applicators being operated with reference to the modified rendered data.

An additive manufacturing system that coordinates the curing, drying, and sintering of materials having different properties during the additive manufacturing of three-dimensional printed objects includes a first material applicator configured to apply a first material to an object being formed by the additive manufacturing system, a second material applicator configured to a second material to the object being formed by the additive manufacturing system, the second material having a material property that is different than a material property of the first material, and a controller operatively connected to the first material applicator and the second material applicator. The controller is configured to: receive rendered data corresponding to the object to be formed by the additive manufacturing system, identify with reference to the received rendered data a layer of the object being formed with the first material and the second material, identify a quantification of each material property of the two materials, modify the received rendered data with reference to the identified quantifications of the material property of each of the materials, and operate the first material applicator and the second material application with reference to the modified rendered data.

BRIEF DESCRIPTION OF THE DRAWINGS

The foregoing aspects and other features of the method and system are explained in the following description, taken in connection with the accompanying drawings.

DETAILED DESCRIPTION

Figure 1:
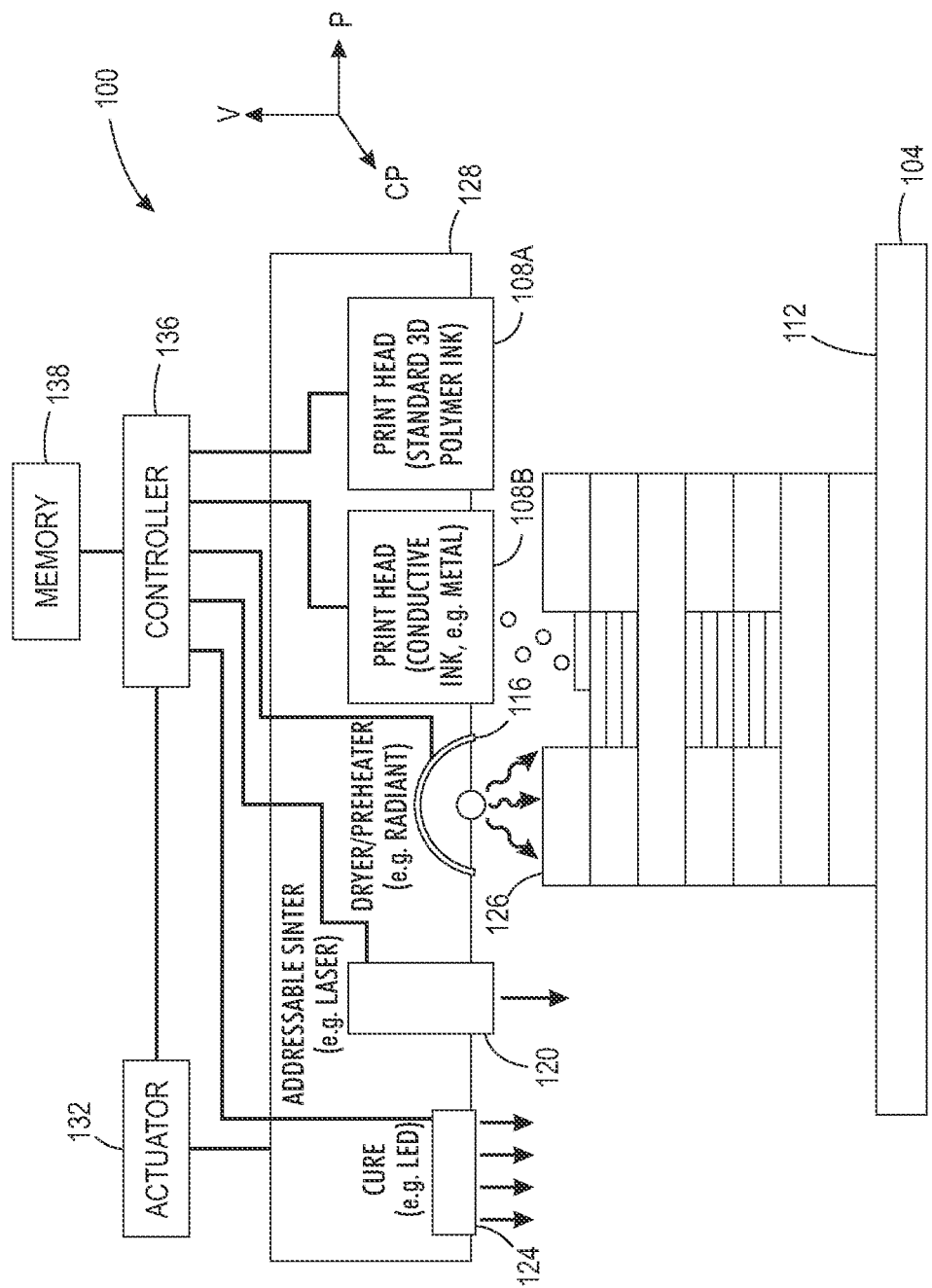
FIG. 1 shows an additive manufacturing system that can coordinate the application, curing, drying, and sintering of materials having different properties during the additive manufacturing of three-dimensional printed objects.

For a general understanding of the system and the method disclosed herein as well as the details for the system and the method, reference is made to the drawings. In the drawings, like reference numerals designate like elements.

FIG. 1 shows a three-dimensional object printer or additive manufacturing system 100 that ejects at least two different materials to form areas within layers of the object being formed. The printer 100 comprises a platen 104 and at least a pair of material applicators 108a, 108b. Although the following discussion describes the material applicators as being ejector heads, other types of material applicators can be used, such as extruders, sprayers, or the like. Each ejector head 108a and 108b has a plurality of ejectors configured to eject drops of material towards a surface 112 of the platen 104 to form areas within layers of a three-dimensional object, such as the part 126. Support areas within these layers can also be formed with other materials to enable part feature formation as known in the art. The ejector heads 108a, 108b, a dryer 116, an addressable sintering device 120, and a curing device 124 are mounted to a member 128, which is operatively connected to one or more actuators 132 so the member can be moved to position these components relative to the platen 104 in the process direction P, the cross-process direction CP, and the vertical direction V.

The printer 100 includes a controller 136 operatively connected to the at least two ejector heads 108a, 108b, the dryer 116, the addressable sintering device 120, the curing device 124, and the one or more actuators 132. The controller 136 is configured to operate the ejector heads 108a, 108b with reference to object image data that has been rendered into layers that form a three-dimensional object, such as part 126, on the platen 112. To form each layer of the three-dimensional object, the controller 136 operates the printer 100 to sweep the ejector heads 108a and 108b one or more times in the process direction P and cross-process direction CP, while ejecting drops of material onto the platen 104 or upon previously formed layers. After each layer is formed, the ejector heads 108 can move away from the platen 104 in the vertical direction V to begin printing the next layer.

As explained below, the controller 136 operates various components in the system 100 in predetermined sequences to form conductive traces on insulating structures with different types of material having different volumetric reduction rates that are ejected by the ejector heads 108a and 108b. As used in this document, "volumetric reduction" refers to shrinkage in a volume of a material that occurs during drying, curing, or sintering of the material. For example, ejector head 108a in system 100 ejects a material having the shrinkage rate that is lower than the shrinkage rate of the material ejected by the ejector head 108b. In the embodiment shown in FIG. 1, ejector head 108a ejects a polymer suitable for forming insulating structures, while ejector head 108b ejects a conductive ink suitable for forming conductive traces on the polymeric insulating structures. Although the system 100 is described as having different ejector heads for different materials, an ejector head can be configured with multiple sets of ejectors, some of which eject one material and some of which eject another material.

The controller 136 is operatively connected to a memory 138 in which different quantifiable properties of the materials applied by the system to form objects, such as volumetric reduction or shrinkage rates, are stored. As used in this document, the term "material properties" refers to empirically quantifiable properties of materials that can be referenced to operate or regulate operation of the three-dimensional printing system. Also as used in this document, "quantification" of a material property refers to data that identifies a material property for a predetermined amount of the material. For example, quantification of a "volumetric reduction rate" or "shrinkage rate" property for a material means data that quantifies an amount of reduction that occurs in a specified volume of applied material during drying, curing, or sintering of the applied material. Controller 136 of FIG. 1 uses these data to determine differences between materials applied to a part being produced, such as different volumes between drops of different materials in a layer caused by curing, drying, or sintering of the materials in the layer or different exposure times or curing conditions for the materials. These material differences are used by the controller 136 to modify the rendered layer data for one of the materials so materials within each layer of the part can be applied, dried, and sintered in a manner that attenuates the adverse impact that would otherwise be caused by the different material properties. To facilitate the continuing discussion in this document, the term "curing" refers to any operation on an applied material that binds the applied material together. "Drying" refers to operations that primarily remove solvents from a solution having a relatively higher volumetric reduction rate and "sintering" refers to operations that primarily bond adjacent layers of dried solute to one another. These operations include, but are not limited to, exposure to radiation, thermal processing, addition of chemicals, or the like.

In the system 100, the dryer 116 is a source of thermal radiation with an air mover, such as a radiant heat source and a fan, although other similar devices can be used as well. The addressable sintering device 120 in FIG. 1 is a laser configured for movement with reference to rendered data corresponding to a layer in an object being printed, although other sintering devices can be used. The curing device 124 is a radiator that emits an ultraviolet (UV) radiation useful for polymerizing suitable materials, although other curing devices can be used as well.

Figure 2:
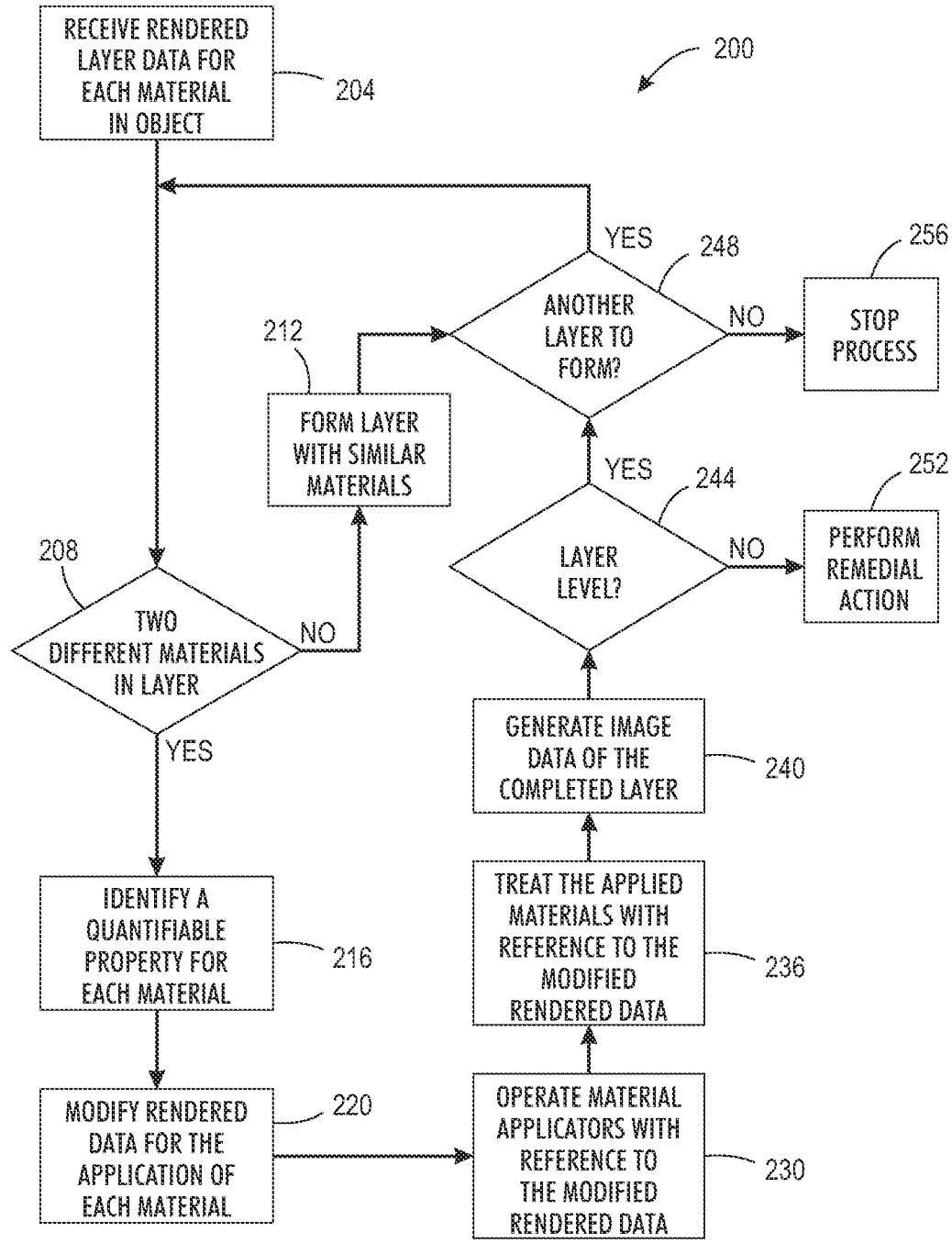
FIG. 2 depicts a process for operating an additive manufacturing system to coordinate the application, curing, drying, and sintering of materials having different properties during the additive manufacturing of three-dimensional printed objects.

A process 200, shown in FIG. 2, is used to operate the system 100 to form a part or object with at least two dissimilar materials. Statements that the process is performing some task or function refers to a controller or general purpose processor executing programmed instructions stored in non-transitory computer readable storage media operatively connected to the controller or processor to manipulate data and operate one or more components in the system to perform the task or function. The controller 136 of the printer 100 noted above can be configured with components and programmed instructions to provide a controller or processor that performs the process 200. Alternatively, the controller can be implemented with more than one processor and associated circuitry and components, each of which is configured to form one or more tasks or functions described herein.

The method 200 begins by receiving rendered layer data for each material to be ejected from the material applicators, such as ejector heads 108 (block 204). The process continues by determining whether materials with different material properties are in a layer to be formed in the object (block 208). If one or more materials having similar materials are being used in the layer, the material applicators are operated to form the layer with these materials and then the layer is appropriately cured (block 212). For example, in the part 126 being formed in FIG. 1, the bottom two layers are formed only with the polymer useful for constructing a foundation. Consequently, the rendered data for the layer is used by the controller to operate the ejector head 108a to form the first layer and then the curing device 124 is operated to cure the ejected material before the next layer is formed with material from ejector head 108a and cured using the device 124. For layers formed with two materials having different material properties, quantifications for one or more of the properties for each of the materials are identified (block 216) and the process modifies the rendered layer data for each of the materials with reference to the quantified material properties (block 220). The modified rendered data are then used to operate material applicators to form the layer with the different materials appropriately (block 230). For example, the rendered data can be modified to enable the two materials to be applied to the object being formed at different times so they can be treated at different times without exposing the materials to adverse environmental conditions. Predetermined operations are then performed on the materials by operating components with reference to the quantified material properties to treat the applied materials in a layer in an appropriate sequence to complete the layer being formed without overly exposing a material to an adverse environmental condition or the like (block 236). In the part 126, these predetermined operations can include the controller operating a curing device, a drying device, and a sintering device to cure, dry, or sinter the different materials at different times. The operations of the material applicators, drying device, curing device, and sintering device can include operating one or more actuators with a controller to move these components with reference to the object being formed.

With further reference to process 200, an optical device, such as a profilometer, can be used to generate image data of the cured layer to enable the process to verify the layer is adequately level for continued production of the part (block 240). If the layer is appropriately formed (block 244), then the process determines whether another layer is to be formed (block 248) and, if so, continues with identification of the materials in the next layer (block 208). Remedial action is taken, if the layer was improperly formed (block 252) or the process stops if no additional layers are to be formed (block 256).

In one example of the process 200 being used to operate the system 100, electrically insulating structures are formed with a material having a material property of a volumetric reduction rate that is less that the volumetric reduction rate of another material used to form conductive traces within or on the insulating structures. The method determines whether the materials with different volumetric reduction rates are in a layer to be formed in the object, and if they are, an amount of volumetric reduction for each of the materials is identified. The process then modifies the rendered layer data for the materials with reference to the two volumetric reduction rates to enable a set of ejectors ejecting the materials to be operated to form a portion of the layer and the curing device is operated to cure the ejected material. Predetermined operations are then performed on the applied materials at appropriate times to cure, dry, and sinter the different materials in different sequence for appropriate exposure times. Thus, an amount of conductive ink can be applied to a cured electrically insulating structure to produce a height that is greater than the height of the insulating structure. After the drying and sintering operations on the conductive ink have taken place, the height of the sintered material formed with the material having the higher volumetric reduction rate is approximately the height of the electrically insulating structure made with the material having the lower volumetric reduction rate. The reader should note that the number of sintering and drying passes do not necessarily have to match. For example, four layers of conductive ink can be applied to an electrically insulating structure and each layer can be individually dried, but sintering occurs every other layer. Thus, four drying treatments are performed on the layers, while only two sintering treatments occur. Other combinations of treatments used on applied layers are possible.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed:

1. A method of additive manufacturing comprising:
receiving with a controller rendered data corresponding to an object to be formed by an additive manufacturing system;
identifying with the controller at least two materials for forming a first layer of the object with reference to the received rendered data, one material of the at least two materials having a material property that is different than a material property of another material of the at least two materials;
identifying with the controller a quantification for each different material property;
modifying with the controller the rendered data with reference to a difference between the identified quantification for each different material property; and
operating with the controller material applicators configured to apply the two materials having different material properties to the object being formed, the material applicators being operated using the rendered data modified with reference to the difference between identified quantification for each different material property; and
operating components with the controller to treat the two materials having different material properties being applied to the object, the components being operated with reference to the difference between the identified quantification for each different material property.

2. The method of claim 1, the operation of the components further comprising:
operating a curing device with the controller to cure one of the two materials with reference to the difference between the identified quantification for each different material property.

3. The method of claim 2, the operation of the curing device further comprising:
operating with the controller a UV radiation source.

4. The method of claim 2, the operation of the components further comprising:
operating a drying device with the controller to dry the other material of the two materials with reference to the difference between the identified quantification for each different material property.

5. The method of claim 4, the operation of the drying device further comprising:
operating with the controller a radiant heat source.

6. The method of claim 4, the operation of the components further comprising:
operating a sintering device with the controller to bond the dried other material to the cured one of the two materials, the controller using the difference between the identified quantification for each different material property to operate the sintering device.

7. The method of claim 6, the operation of the sintering device further comprising:
operating with the controller a laser.

8. The method of claim 1, the operation of the components further comprising:
operating a drying device with the controller to dry at least one of the two materials with reference to the difference between the identified quantification for each different material property.

9. The method of claim 8, the operation of the drying device further comprising:
operating with the controller a radiant heat source.

10. The method of claim 1, the operation of the components further comprising:
operating a sintering device with the controller to bond the two different materials together, the controller using the difference between the identified quantification for each different material property to operate the sintering device.

11. The method of claim 10, the operation of the sintering device further comprising:
operating with the controller a laser.

12. The method of claim 11, the operation of the laser further comprising:
moving the laser with the controller with reference to the difference between the identified quantification for each different material property.

13. A method of additive manufacturing comprising:
receiving with a controller rendered data corresponding to an object to be formed by an additive manufacturing system;
identifying with the controller at least two materials for forming a first layer of the object with reference to the received rendered data, one material of the at least two materials having a material property that is different than a material property of another material of the at least two materials;
identifying with the controller a quantification for each different material property;
modifying with the controller the rendered data with reference to a difference between the identified quantification for each different material property; and
operating with the controller material applicators configured to apply the two materials having different material properties to the object being formed, the material applicators being operated using the rendered data modified with reference to the difference between identified quantification for each different material property;
operating components with the controller to treat the two materials having different material properties being applied to the object, the components being operated with reference to the difference between the identified quantification for each different material property, the operation of the components including operating a curing device with the controller to cure one of the two materials with reference to the difference between the identified quantification for each different material property;
generating with a profilometer image data of the first layer formed with the at least two materials after the first layer has been cured by operation of the curing device; and
verifying the cured first layer is level.

14. The method of claim 13 further comprising:
operating the sintering device with the controller to bind the two materials together after the cured first layer is verified as being level.

15. The method of claim 14 further comprising:
identifying with reference to the received rendered data at least two materials in a second layer of the object to be formed on the verified cured first layer, one material of the at least two materials having a material property that is different than a material property of another material of the at least two materials;
identifying with the controller a quantification for each different material property of the at least two materials in the second layer;
modifying with the controller the rendered data with reference to a difference between the identified quantification for each different material property of the at least two materials in the second layer; and
operating with the controller material applicators configured to apply the two materials having different material properties to the object being formed, the material applicators being operated using the rendered data modified with reference to the difference between identified quantification for each different material property of the at least two materials in the second layer.

16. The method of claim 15 further comprising:
operating components with the controller to treat the two materials having different material properties in the second layer, the components being operated with reference to the difference between the identified quantification for each different material property of the at least two materials in the second layer.

17. The method of claim 16, the operation of the components further comprising:
operating a curing device with the controller to cure one of the two materials with reference to the difference between the identified quantification for each different material property of the at least two materials in the second layer.

18. A method of additive manufacturing comprising:
receiving with a controller rendered data corresponding to an object to be formed by an additive manufacturing system;
identifying with the controller at least two materials for forming a first layer of the object with reference to the received rendered data, a first material of the at least two materials having a first quantification of a material property and a second material of the at least two materials having a second quantification of the material property that is different than the first quantification;
identifying with the controller the first quantification and the second quantification;
identifying with the controller a difference between the first quantification and the second quantification;
modifying with the controller the rendered data with reference to the difference between the first quantification and the second quantification;
operating with the controller material applicators configured to apply the first material and the second material to the object being formed, the material applicators being operated using the rendered data modified with reference to the difference between the first quantification and the second quantification; and operating an actuator with the controller to move the material applicators using the difference between the first quantification and the second quantification.

19. A method of additive manufacturing comprising:

receiving with a controller rendered data corresponding to an object to be formed by an additive manufacturing system;

identifying with the controller at least two materials for forming a first layer of the object with reference to the received rendered data, a first material of the at least two materials having a first volumetric reduction rate that is greater than a second volumetric reduction rate of a second material of the at least two materials;

identifying with the controller the first volumetric reduction rate of the first material;

identifying with the controller the second volumetric reduction rate of the second material;

modifying with the controller the rendered data with reference to a difference between the identified first volumetric reduction rate and the identified second volumetric reduction rate;

operating with the controller material applicators configured to apply the two materials having different volumetric reduction rates to the object being formed, the material applicators being operated using the rendered data modified with reference to the difference between the first volumetric reduction rate and the identified second volumetric reduction rate.

\* \* \* \* \*